(12) United States Patent  (10) Patent No.: US 7,856,316 B2
Okamoto  (45) Date of Patent: Dec. 21, 2010

(54) NAVIGATION SYSTEM

(75) Inventor: Tadashi Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/662,176

(22) Filed: Apr. 5, 2010

(65) Prior Publication Data
US 2010/0235086 A1 Sep. 16, 2010

Related U.S. Application Data

(60) Continuation of application No. 12/010,470, filed on Jan. 25, 2008, now Pat. No. 7,765,063, which is a division of application No. 10/376,590, filed on Mar. 3, 2003, now Pat. No. 7,689,353.

(30) Foreign Application Priority Data

Mar. 13, 2002 (JP) ............................ 2002-068124

(51) Int. Cl.
G06F 19/00 (2006.01)
(52) U.S. Cl. ................. 701/211; 701/214; 340/995; 348/9; 715/740
(58) Field of Classification Search .......... 701/207, 701/211, 214; 348/9; 395/200.47; 340/995, 340/988; 715/740
See application file for complete search history.

(56) References Cited

U.S. PATENT DOCUMENTS

| 4,766,434 | A | 8/1988 | Matai et al. |
|---|---|---|---|
| 5,432,542 | A | 7/1995 | Thibadeau et al. |
| 5,565,909 | A | 10/1996 | Thibadeau et al. |
| 5,815,824 | A | 9/1998 | Saga et al. |
| 5,819,200 | A | 10/1998 | Tamai et al. |
| 5,848,375 | A | 12/1998 | Nunobiki et al. |
| 5,905,865 | A | 5/1999 | Palmer et al. |
| 6,064,942 | A | 5/2000 | Johnson et al. |
| 6,081,907 | A | 6/2000 | Witty et al. |
| 6,091,956 | A * | 7/2000 | Hollenberg .............. 455/456.5 |
| 6,107,944 | A | 8/2000 | Behr et al. |
| 6,118,389 | A | 9/2000 | Kamada et al. |
| 6,128,482 | A | 10/2000 | Nixon et al. |
| 6,148,261 | A | 11/2000 | Obradovich et al. |
| 6,226,522 | B1 | 5/2001 | Higuchi |
| 6,393,149 | B2 | 5/2002 | Friederich et al. |
| 6,405,123 | B1 | 6/2002 | Rennard et al. |
| 6,606,033 | B1 | 8/2003 | Crocker et al. |
| 6,621,452 | B2 | 9/2003 | Knockeart et al. |
| 6,711,543 | B2 | 3/2004 | Cameron |

(Continued)

Primary Examiner—Ronnie Mancho
(74) Attorney, Agent, or Firm—Rader, Fishman & Grauer PLLC

(57) ABSTRACT

Disclosed are a navigation system and/or a point information display method and a program. The navigation system consists mainly of: a stream receiver that receives broadcast streams; a data decoder that samples a data signal from the received streams and decodes the data signal into character string information; a matching block that performs matching to compare a predetermined keyword, which is associated with position information specified in map information data, with stored keywords and searches a keyword consistent with the keyword contained in the character string information; a position information searching block that searches position information associated with the keyword contained in the character string information and detected to be consistent with a stored keyword by the matching block; and a display unit that displays the detected position information while superimposing it on a display image.

21 Claims, 6 Drawing Sheets

U.S. PATENT DOCUMENTS

| | | |
|---|---|---|
| 6,760,770 B1 | 7/2004 | Kageyama |
| 6,816,778 B2 * | 11/2004 | Diaz .......................... 701/200 |
| 7,073,129 B1 * | 7/2006 | Robarts et al. .............. 715/740 |
| 7,114,169 B1 | 9/2006 | Kahn |
| 7,246,109 B1 | 7/2007 | Ramaswamy |
| 7,289,812 B1 | 10/2007 | Roberts et al. |
| 2002/0032035 A1 | 3/2002 | Teshima |
| 2002/0036571 A1 | 3/2002 | Takahashi et al. |
| 2002/0062246 A1 | 5/2002 | Matsubara |
| 2002/0109602 A1 | 8/2002 | Shinada et al. |
| 2002/0156570 A1 | 10/2002 | Ohtsuji et al. |
| 2003/0081671 A1 | 5/2003 | Ishida et al. |
| 2003/0212996 A1 | 11/2003 | Wolzien |
| 2005/0033511 A1 | 2/2005 | Pechatnikov et al. |
| 2008/0070559 A1 | 3/2008 | Behr et al. |

* cited by examiner

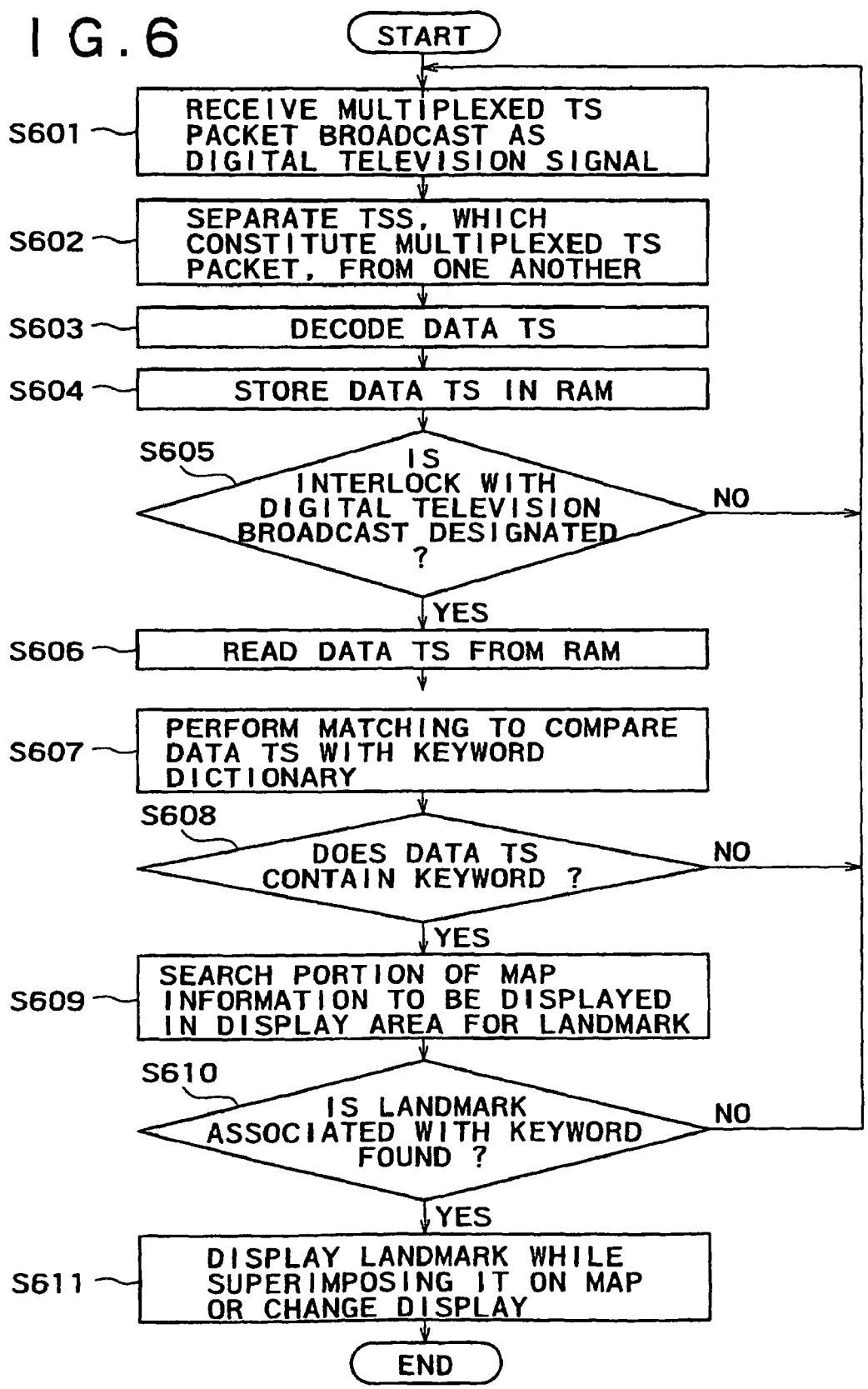

NAVIGATION SYSTEM

CROSS REFERENCE TO RELATED APPLICATIONS

The present application is a continuation application of U.S. application Ser. No. 12/010,470, filed Jan. 25, 2008, which is a divisional application of U.S. application Ser. No. 10/376,590, filed Mar. 3, 2003, which in turn claims priority from Japanese Application No. 2002-068124, filed Mar. 13, 2002, the entire content each of which are incorporated by reference.

BACKGROUND OF THE INVENTION

1. Field of the Invention

The present invention relates to a navigation system, or more particularly, to a navigation system capable of presenting point information associated with data of broadcast contents and a map data display method.

2. Description of the Related Art

Navigation systems can detect the position of an own vehicle and a traveling speed thereof in real time by utilizing the global positioning system (GPS). A map is displayed on a display unit according to digitized map data. A current position measured by the GPS, a recommended route to a destination along which a user is guided to the destination, or the like is displayed while being superimposed on the display map.

The navigation system can present marks, which represent various landmarks such as fast-food restaurants, convenience stores, family restaurants, and event halls, while superimposing them on a map displayed on a display unit on the basis of point information (hereinafter the marks displayed on the display unit shall be called landmarks). As for display of the landmarks, what category should be displayed or not displayed can be designated by selecting a menu item from any of hierarchically structured menus displayed on the display device.

As mentioned above, landmarks can be superimposed on a map presented by a navigation system. In a conventional navigation system, landmarks existent in a portion of a map displayed on the display unit are merely displayed based on point information.

Incidentally, on-vehicle equipment includes a broadcast receiver having the ability to receive programs broadcast from television or radio broadcasting stations. A commercial message (CM) is inserted between broadcast programs. Assume that a CM is broadcast while a user who may be a driver or a passenger in a compartment is watching or listening to a program presented by the broadcast receiver.

For example, the CM is a CM concerning a fast-food restaurant. The user may want to drop at the fast-food restaurant. In this case, the user uses the navigation system to search the nearest fast-foot restaurant on the basis of a displayed region (current point). The user then designates the fast-food restaurant displayed as the result of the search, and searches a route to the fast-food restaurant by himself or herself.

As mentioned above, when a specific one is designated from among displayed landmarks or a new landmark is searched, an action must be performed on the navigation system. Consequently, the navigation system must be operated. It is a nuisance to operate the navigation system for search every time a user gets interested in a program or a CM that is broadcast from time to time. Besides, it is dangerous to operate the navigation system during driving.

SUMMARY OF THE INVENTION

Accordingly, an object of the present invention is to provide a navigation system enabling a user to visually grasp the position of a store or the like in association with the contents of a CM or a program received by a broadcast receiver.

Another object of the present invention is to provide a means for adding a value to information of stores or the like registered as one of landmarks.

Through a discussion on the foregoing underlying problems, a present inventor concentrated his attention on a stream that is employed in digital television broadcast whose service will start in the near future. According to the present invention, a specific keyword contained in any of streams representing a CM or a program triggers off presentation of the position of a broadcast store or the like by a navigation system.

In order to accomplish the above objects, one aspect of the present invention resides in a navigation system having the components described below. That is to say, the navigation system consists mainly of: a stream receiving means for receiving broadcast streams; a data decoding means for sampling a data signal from the received streams and decoding the data signal into character string information; a keyword recording means in which predetermined keywords associated with position information specified in map information data are stored; a matching means for performing matching to compare character string information with each of the keywords stored in the keyword recording means and searching a keyword consistent with a keyword contained in the character string information; a position information searching means for searching position information associated with the keyword contained in the character string information and detected to be consistent with a recorded keyword by the matching means; and a display means for displaying the detected position information while superimposing it on a display image. When it says that position information is displayed while being superimposed on a display image, it means that the position information may be not only superimposed on the display image but also allowed to flicker or colored so that it can be distinguished from the other position information.

When position information associated with a keyword is contained in a portion of a map image displayed on the display means, a mark indicating the position information is displayed on the map image.

The navigation system further includes a display control means for changing the scale for a portion of a map image displayed on the display means when position information associated with a keyword is not contained in the portion of the map image.

In another aspect, the navigation system includes a navigation means for searching the route to the position indicated with a mark displayed on the display means or for guiding a user to the position.

In the navigation system having the foregoing components, if a received stream contains a keyword, position information associated with the keyword, that is, a mark is displayed on the display screen. A received stream is searched for a keyword in real time (stream reception). If the keyword is contained in the stream, the keyword triggers off display of associated position information. Namely, the navigation system presents position information in association with a received stream.

In still another aspect, the present invention resides in a navigation system having the components described below. That is to say, the navigation system consists mainly of: an information processing unit for sampling position information associated with contents acquired externally; and a display unit that displays the sampled position information in association with the received contents while superimposing it on a map image. A means for acquiring contents externally may be a contents receiving unit included in the navigation system. Otherwise, other equipment may receive contents and the navigation system may receive the contents.

A memory in which position information is temporarily stored may be included. When position information cannot be displayed in association with contents, the position information is stored in the memory. Position information read from the memory is superimposed on a map image displayed on the display unit. When position information is thus stored in the memory, even after contents are watched or listened to, position information can be displayed.

In yet another aspect, the present invention resides in a point information display method adaptable to a navigation system. That is to say, the point information display method consists mainly of: a step of receiving broadcast contents and decoding information concerning the contents; a step of judging whether a keyword association with point information concerning a position on a map is contained in the decoded information; and a step of searching map information data for point information associated with the keyword contained in the decoded information, and displaying the point information while superimposing it on the map.

In another aspect, the present invention resides in a program for controlling an information processor that displays map information and point information. That is to say, the program allows the information processor to perform: a process for receiving a broadcast radio wave, separating a predetermined signal from the other components of the radio wave, and decoding the predetermined signal; a process for searching the decoded information for character string information consistent with a keyword stored in the information processor; and a process for displaying point information according to point information and position information associated with the keyword while superimposing the point information on a map image.

Other and further objects, features and advantages of the invention will appear more fully from the following description.

BRIEF DESCRIPTION OF THE DRAWINGS

FIG. 6 is a flowchart describing a flow of processing steps according to which display and non-display of a landmark is switched in association with a CM or a program.

DETAILED DESCRIPTION OF THE PREFERRED EMBODIMENTS

Referring to the appended drawings that show an embodiment of the present invention, the present invention will be described below.

The number of users of digital television broadcast dependent on a satellite broadcasting service is increasing. Moreover, provision of a digital television broadcast service based on ground waves is going to start. A packet employed in digital television broadcast and transmitted from a broadcasting station has a data field. The packet employed in digital television broadcast will be described later. According to the present embodiment, a navigation system uses information recorded in the data field to present a landmark in association with the contents of a broadcast CM or program (with a keyword contained in the CM or program as a trigger).

Figure 1:
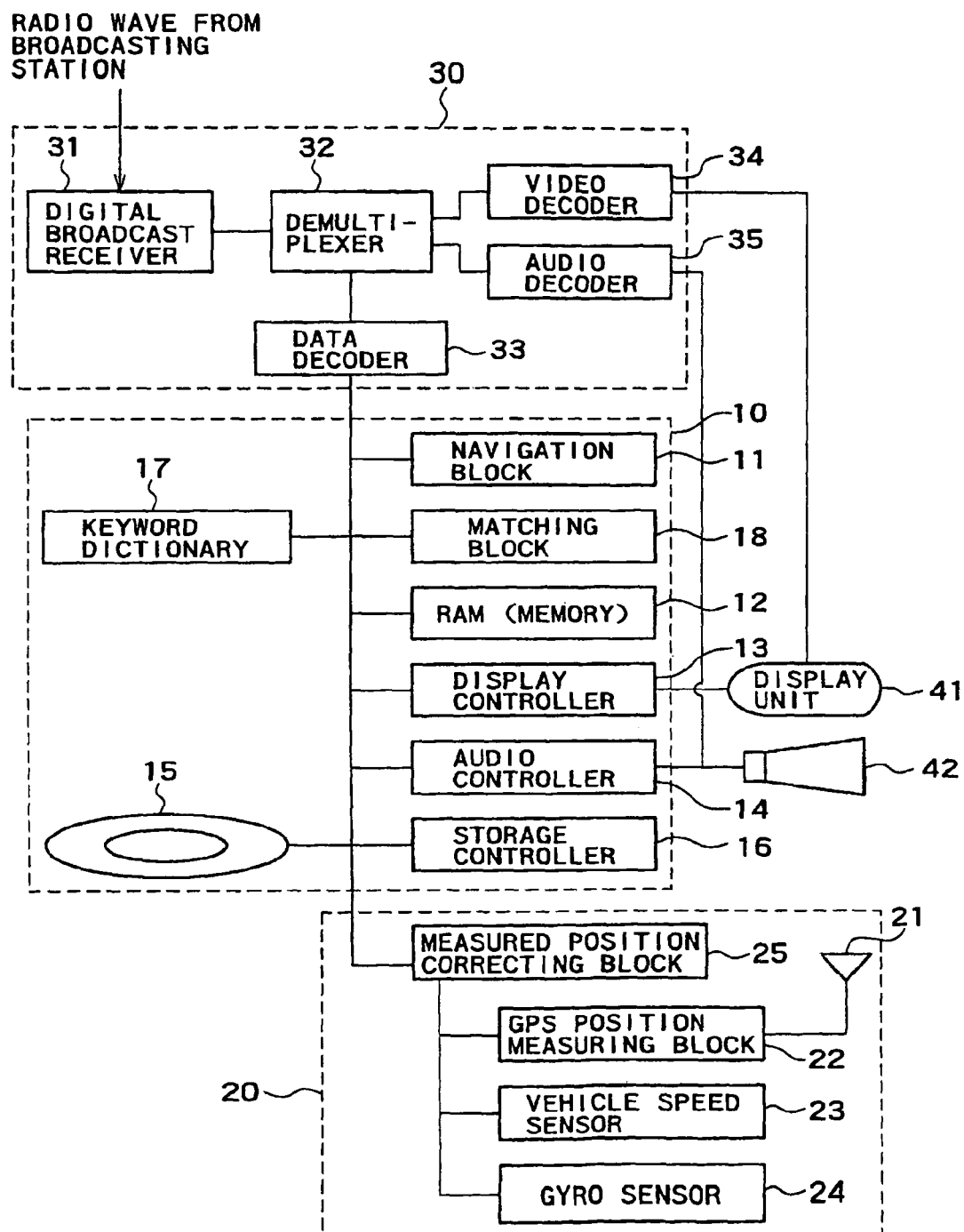
FIG. 1 is a block diagram showing the configuration of a navigation system in accordance with an embodiment of the present invention.

FIG. 1 is a block diagram showing the configuration of the navigation system in accordance with the present embodiment.

As illustrated, the navigation system consists mainly of: a display unit 41 such as a liquid crystal display or any other monitor on which a map and various kinds of information are displayed responsively to a manipulation performed on an operating unit such as a remote controller or a control panel; a loudspeaker 42 for generating voice or the like so as to give a guidance; a control unit 10 for controlling the whole navigation system; and a position measuring unit 20 for measuring the position of a vehicle. As mentioned above, the navigation system in accordance with the present embodiment includes a broadcast receiver unit 30 that receives a digital television signal. Hereinafter, a case where the broadcast receiver unit 30 is integrated with the navigation system will be described. As long as data can be transmitted to the control unit 10, the navigation system and the broadcast receiver unit 30 may be independent of each other.

The control unit 10 consists mainly of: a navigation block 11 having a ROM in which a program describing a control sequence for controlling the whole navigation system is stored and a CPU that performs arithmetic operations according to the program stored in the ROM; a RAM (memory) 12 serving as an internal memory for assisting in performing actions described in the program, and holding data of a map and others; a display controller 13 for controlling data to be displayed on the display unit 41; an audio controller 14 for controlling audio data that is generated by the loudspeaker 42 in order to give a guidance or the like; a disk drive 15 capable of reading map information from a recording disk such as a CD-ROM or DVD-ROM in which map information data concerning a predetermined wide area is stored; and a storage controller 16 for controlling the disk drive 15.

Moreover, the control unit 10 included in the navigation system in accordance with the present embodiment includes: a matching block 18 composed of a ROM in which a matching program that will be described later is stored and a CPU that performs arithmetic operations according to the program; and a keyword dictionary 17 in which keywords used for matching are recorded.

The position measuring unit 20 includes: a GPS antenna 21 through which a signal originated from any of GPS satellites is received; a GPS position measuring block 22 that measures a position according to a signal received through the GPS antenna 21; a vehicle speed sensor 23 for detecting the vehicle speed of a vehicle in which the navigation system is mounted; a gyro sensor 24 for detecting a rotational displacement made by the vehicle; and a measured position correcting block 25 for correcting the result of position measurement performed by the GPS position measuring unit 22 according to a value produced by the gyro sensor 24. In the navigation system, displaying the position of a vehicle and giving a guidance are performed based on a value provided by the measured position correcting block 25.

The navigation system in accordance with the present embodiment includes the broadcast receiver unit 30 capable of receiving a digital television signal. The broadcast receiver unit 30 includes: a digital broadcast receiver 31 for receiving a radio wave (packet) from a broadcasting station; a demultiplexer 32 for separating a video signal, an audio signal, and a data signal, which constitute a multiplexed signal, from one another and providing the separated signals; a data decoder 33 for decoding the data signal and transmitting the resultant signal to the control unit 10; a video decoder 34 for decoding the video signal and displaying an image on the display unit 41 according to the resultant signal; and an audio decoder 35 for decoding the audio signal and generating sounds from the loudspeaker 42 according to the resultant signal. The demultiplexer 32 separates the video signal, audio signal, and data signal from one another while referencing time stamps indicating time instants at which the signals are encoded. The time bases for the video signal and audio signal respectively are synchronized with each other, so that output units can reproduce an image and sounds according to the video and audio signals at proper timings. The time base for the data signal accompanying the video and audio signals is also synchronized with the time bases for the video and audio signals during matching. The timing of processing data can be matched with the timing of reproducing the image and sounds.

Figure 2:
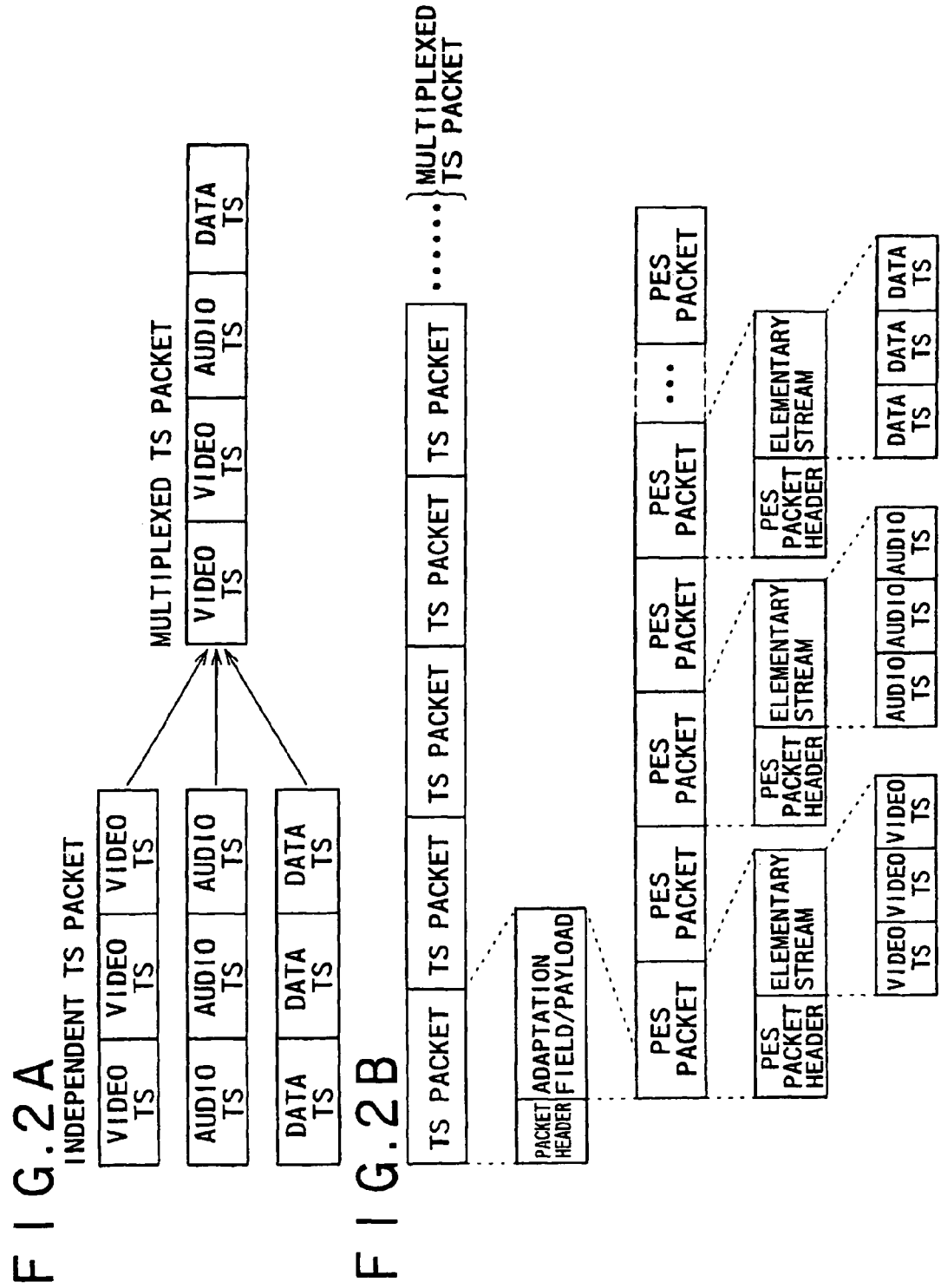
FIG. 2A and FIG. 2B show packets employed in digital television broadcast and transmitted during digital television broadcast.

FIG. 2A and FIG. 2B show packets employed in digital television broadcast and transmitted during digital television broadcast.

As shown in FIG. 2A, transport streams (TS) include a video transport stream (TS) that represents a video signal, an audio transport stream (TS) that represents an audio signal, and a data transport stream (TS) that represents a data signal. Video TSs, audio TSs, or data TSs are gathered up to produce an independent TS packet. The independent TS packets of video TSs, audio TSs, and data TSs respectively are multiplexed with the time bases therefor matched with one another, whereby a multiplexed TS packet composed of the video TSs, audio TSs and data TSs is produced.

In a data TS field of the multiplexed TS packet, information concerning the contents of a video TS and an audio TS is described in the form of, for example, an ASCII character string. The data TS contains not only information of, for example, a fast-food restaurant or a convenience store but also information of a store name (or a company name or a group name) such as "○○○ Burger" or "△△△ Store." Moreover, the data TS may contain information that is displayed as a superimposed caption or a product name. From information contained in the data TS, it can be judged to what a currently broadcast CM or program is related. If the data TS contains specific character string information (keyword), the character string information may trigger off display of a landmark in association with a CM or program.

FIG. 2B shows the structure of a multiplexed TS packet composed of independent TS packets shown in FIG. 2A. As shown in FIG. 2B, a plurality of video TSs constitutes an elementary stream (ES) that is a series of streams having an unrestricted length. A packed elementary stream (PES) packet header is appended to the start of the ES, whereby a PES packet is produced. Likewise, a PES packet is produced from audio TSs or data TSs. The PES packet composed of independent TSs such as video TSs, audio TSs, or data TSs is transmitted while being split into an adaptation field having a leading packet header and a payload. Thus, one TS packet is produced. A packet identifier (PID) or the like is defined in the packet header. Based on the PID, a kind of TS packet can be identified. Recorded in the adaptation field is information of program_clock_reference (PCR) that is referenced in order to match time bases with one another during decoding. Based on the PCR information, the timing of reproducing each TS packet can be controlled. A plurality of TS packets is gathered up to produce a multiplexed TS that looks like one stream having a plurality of programs incorporated therein. The thus produced multiplexed TS is utilized for digital television broadcast. As mentioned above, the multiplexed TSs employed in digital television broadcast are transmitted as a multiplexed TS packet composed of video streams, audio streams, and data streams.

Figure 3:
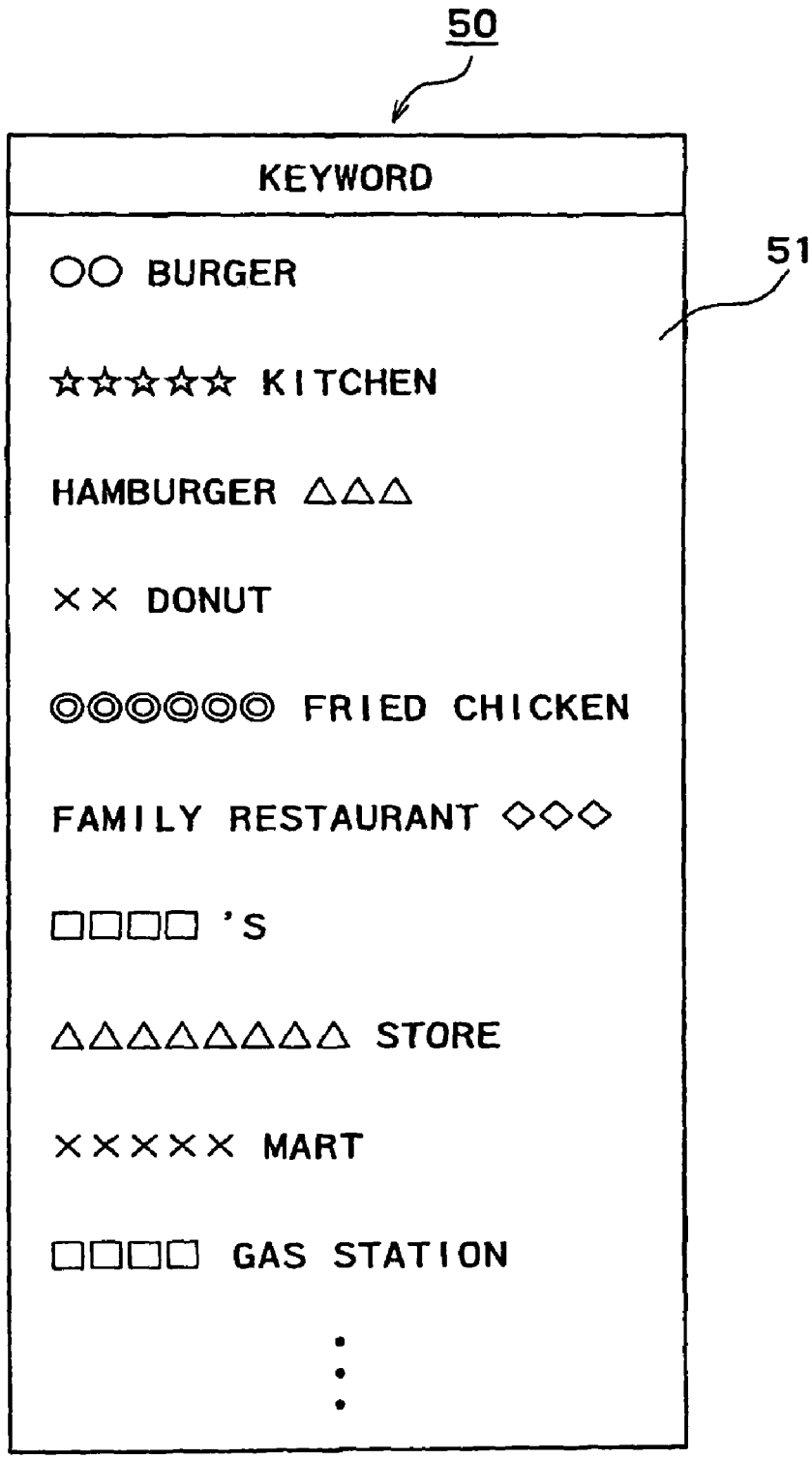
FIG. 3 shows a table recorded in a keyword dictionary employed in the embodiment.

FIG. 3 shows a table recorded in the keyword dictionary 17 included in the present embodiment. As illustrated, recorded in a keyword field in a keyword table 50 are not only a category of business but also a concrete store name. For example, "○○○ Burger" and "*** Kitchen" that are names of fast-food restaurants, "Family Restaurant ♦♦♦" and "□□□'S" that are names of family restaurants, and "△△△ Store" and "xxx Mart" that are names of convenience stores are recorded.

According to the present invention, matching is performed in order to compare character string information, which is contained in a data TS representing a CM or program received by the digital broadcast receiver 31, with each of the keywords recorded in the keyword table 50 contained in the keyword dictionary 17.

For example, assume that a CM concerning "○○○ Burger" is broadcast. The digital broadcast receiver 31 receives the CM, and the demultiplexer 32 separates different kinds of signal components from one another so as to thus decode the received signal. A data TS (character string information) decoded by the data decoder 33 is transferred to the RAM 12 included in the control unit 10 and held in the RAM 12. Assume that the data TS contains a character string "○○○ Burger." The matching block 18 judges whether the character string information in the data TS held in the RAM 12 contains a keyword consistent with any of the keywords recorded in the keyword table 50.

Through matching, it is judged that the data TS representing the CM contains a character string "○○○ Burger" consistent with a recorded keyword. Position information and a landmark concerning "○○○ Burger" are contained in map information. The navigation block 11 searches the map information for the data of the landmark (for the position information) so as to judge whether the information of "○○○ Burger" is contained in a portion of the map information that can be displayed on the display unit 41. The landmark for "○○○ Burger" that can be displayed on the display unit is displayed while being superimposed on a map displayed on the display unit 41.

As mentioned above, when a keyword is specified in character string information contained in a data TS, map information is searched for a landmark associated with the keyword. The landmark is then displayed on the display unit 41. Through matching, a keyword contained in a stream representing a CM triggers off real-time display of a landmark associated with the contents of the CM or program.

As mentioned above, the keyword table 50 that is prepared in advance is used to perform matching. Otherwise, the contents of a received data TS may be analyzed to detect a keyword. The keyword may then be added to the keyword table 50 so that the navigation system will learn the keyword.

Figure 4A:
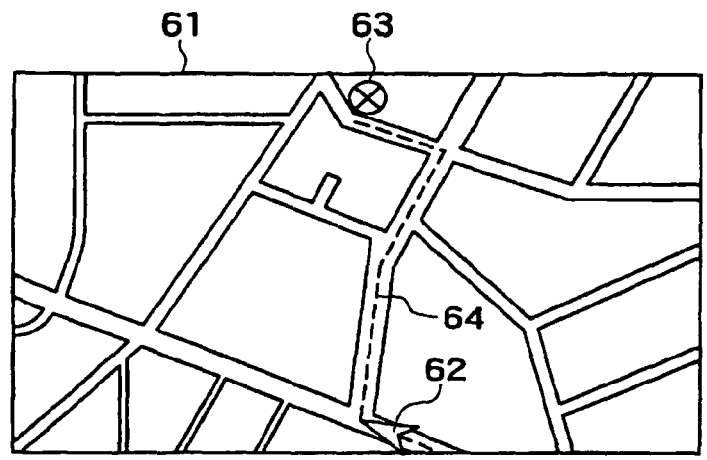
FIG. 4A and FIG. 4B show an example of display on a display unit included in the navigation system in accordance with the embodiment.
Figure 4B:
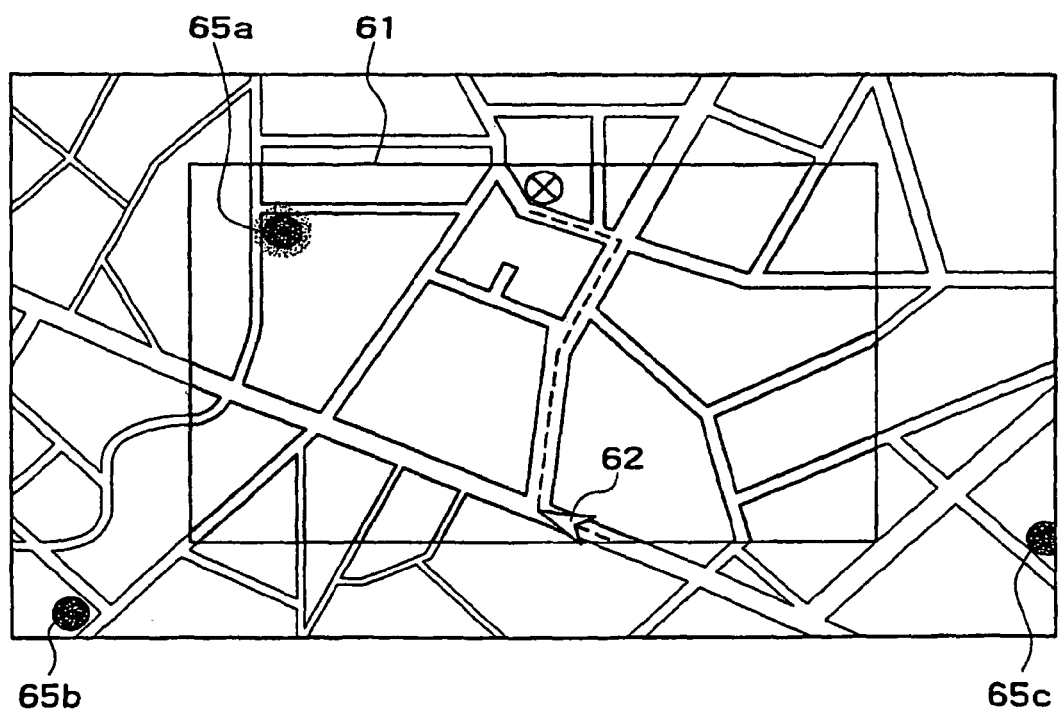

FIG. 4A and FIG. 4B show an example of display on the display unit 41 included in the navigation system of the present embodiment.

As shown in FIG. 4A, normally, a recommended route 64 from an own-vehicle position 62 to a destination 63 is displayed in a display area 61 (in which a map image is displayed) on the display unit 41 included in the navigation system.

When a digital television signal specifying character string information consistent with a character string recorded in the keyword table 50 is received during driving, the foregoing matching is carried out. Thereafter, as shown in FIG. 4B, a landmark 65a contained in a portion of map information that can be displayed in the display area 61 flickers. The landmark 65a is kept displayed until a keyword contained in character string information makes a hit next.

A landmark 65b and a landmark 65c located near the own-vehicle position 62 are associated with a keyword that has made a hit. However, since the landmarks are contained in a portion of map information that falls outside the display area 61, they are not displayed. Herein, the landmarks associated with the keyword that has made a hit and contained in the portion of the map information that falls outside the display area 61 are not displayed. Alternatively, a landmark located at a predetermined distance or less from the own-vehicle position 62 may be displayed by changing the scale for the portion of the map information that is displayed in the display area 61.

If no landmark can be displayed in association with a CM or program in the display area, nothing may be displayed. Otherwise, the display controller 13 may change the scale for the portion of the map information that is displayed in the display area 61 so that a landmark can be displayed.

The navigation block 11 selects a landmark located in a direction of advancement, in which the vehicle advances from the own-vehicle position 62, on the basis of information acquired by the position measuring unit 20. The position information concerning the selected nearest landmark is used to search a route. Thus, a user can be guided to the point of the nearest landmark without the necessity of changing the direction of advancement from the own-vehicle position 62. As mentioned above, a keyword contained in character string information triggers off display of a landmark. Moreover, a user can perform manipulations so as to change his/her destination from the initial destination 63 to the point of the landmark 65a, and can be informed of the route to the landmark 65a.

Figure 5:
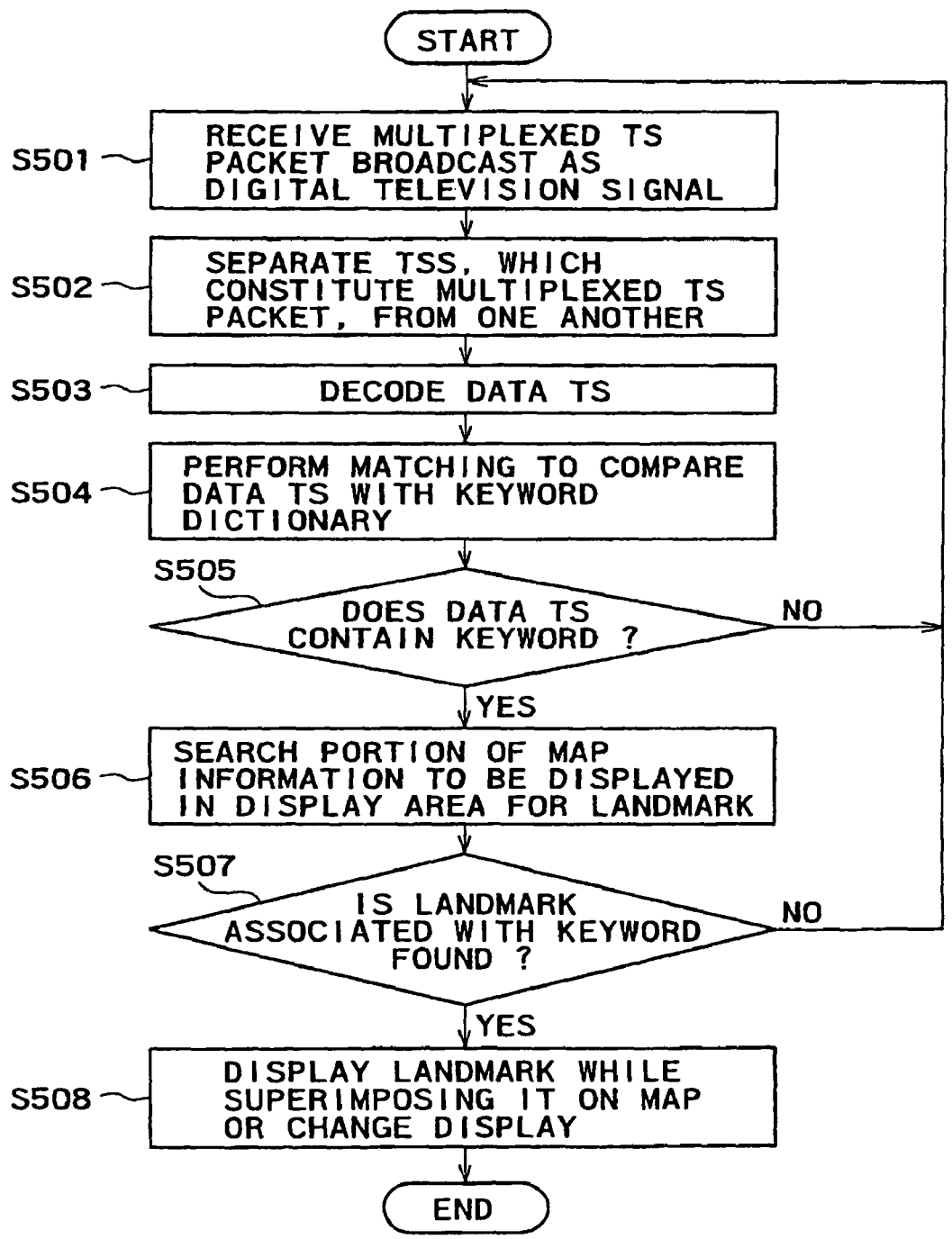
FIG. 5 is a flowchart describing a flow of processing steps according to which the navigation system of the embodiment presents a landmark in association with a CM or a program.

FIG. 5 is a flowchart describing a flow of processing steps according to which the navigation system of the present embodiment presents a landmark in association with a CM or program.

The digital broadcast receiver 31 included in the broadcast receiver unit 30 receives a multiplexed TS packet broadcast as a digital television signal (step 501). The demultiplexer 32 separates TSs, which constitute the multiplexed TS packet, from one another (step 502). Among the separated TSs, a data TS is decoded by the data decoder 33 (step 503). The data TS is then transferred to the control unit 10.

When the control unit 10 receives the data TS, the matching block 18 performs matching (step 504). During the matching, it is judged whether the data TS contains a keyword that is consistent with any of the keywords recorded in the (keyword table 50 in the) keyword dictionary 17 (step 505).

If it is judged at step 505 that the data TS does not contain the keyword, steps 501 to 505 are repeatedly performed on subsequent multiplexed TS packets. If it is judged at step 505 that the data TS contains the keyword, a portion of a map to be displayed in the display area on the display unit 41 is searched for a landmark associated with the keyword (step 506). If it is then judged whether the landmark associated with the keyword is found (step 507).

If it is judged at step 507 that the landmark is not found, steps 501 to 507 are repeatedly performed on subsequently received data TSs. If it is judged at step 505 that the landmark is found, the display controller 13 displays the landmark at a predetermined position while superimposing it on the map displayed on the display unit 41 (step 508). A landmark to be displayed in association with a CM or program may be displayed to flicker or displayed in a color different from a color in which the other landmarks are displayed. In any case, the landmark is displayed to be distinguishable from the other landmarks.

FIG. 5 describes an example of displaying a landmark all the time according to a received data TS. FIG. 6 describes a flow of processing steps for switching display and non-display of a landmark associated with a CM or program.

Steps 601 to 603 are identical to steps 501 to 503 described in FIG. 5. The description of the steps will therefore be omitted.

When the control unit 10 receives a data TS, the data TS is stored and held in the RAM 12 (step 604). It is then judged whether the interlock of display of a landmark with digital television broadcast is designated (step 605). If it is judged at step 605 that the interlock with digital television broadcast is undesignated, steps 601 to 605 are repeatedly performed on subsequently received TS packets. Meanwhile, the received data TSs are sequentially stored in the RAM 12. If it is judged at step 605 that the interlock with digital television broadcast is designated, the data TS is read from the RAM 12 (step 606). Matching is performed on the data TS.

Steps 607 to 611 succeeding the matching are identical to steps 504 to 508 described in FIG. 5. The description of the steps will therefore be omitted.

The ability to perform matching on a data TS received by the digital broadcast receiver 31 has been described. The object of matching is not limited to the data TS broadcast as a component of a digital television signal. For example, if an audio TS can be sampled, the sampled audio TS may be compared with the keyword dictionary 17 during matching. Consequently, a landmark associated with a keyword contained in the audio TS can be displayed.

As mentioned above, the navigation system of the present embodiment includes the keyword dictionary 17 in which keywords associated with landmarks are recorded, and the matching block 18 that performs matching so as to compare a received data TS with keywords. Since the navigation system includes these facilities, even if a data TS transmitted from a broadcasting station does not conform to a special format, a landmark can be searched through matching. Consequently, a landmark associated with a keyword that has made a hit can be displayed.

A user of the navigation system can discern information of a store or the like broadcast during a CM or program without the necessity of performing special manipulations. Moreover, a landmark presented by the navigation system is the nearest landmark located in a direction of advancement. The user is therefore encouraged to drop at the indicated point.

A sponsor of a CM to be broadcast as a digital television signal does not merely broadcast the CM but appends a keyword to a data TS so that the keyword will trigger off display of a landmark. Thus, the sponsor can appeal to users at a good timing. That is to say, when broadcast of a CM is interlocked with display of a landmark, the landmark presented by the navigation system has the value of an advertisement of a store or the like.

Moreover, the navigation system of the present embodiment utilizes a data TS received by the digital broadcast receiver 31. Therefore, software capable of performing matching and displaying a landmark should merely be provided. Consequently, an increase in the cost of manufacture stemming from addition of facilities can be suppressed.

Furthermore, since a landmark in map information recorded in a DVD-ROM or the like has the value of an advertisement, if advertisers who want to register their store names or the like in the keyword dictionary 17 at a charge are recruited, map information can be provided for users at: a low cost.

As described so far, according to the present invention, there is provided a navigation system enabling a user to visually grasp the position of a store or the like in association with the contents of a CM or program received by a broadcast receiver.

Moreover, according to the present invention, information of a store or the like registered as a landmark is added a value. Consequently, the usefulness of CMs can be improved and users' convenience can be ensured.

The foregoing invention has been described in terms of preferred embodiments. However, those skilled, in the art will recognize that many variations of such embodiments exist. Such variations are intended to be within the scope of the present invention and the appended claims.

What is claimed is:

1. A portable device, comprising:
a display portion that displays map information for a predetermined area;
a receiving portion that receives a broadcast stream having a commercial message;
a producing portion that produces, from the broadcast stream, a first content, including at least one of a video signal and an audio signal, and a second content, including keyword information, the keyword information containing a plurality of keywords;
a recording portion that records a plurality of predetermined keywords associated with position information, specified in the map information data; and
a matching portion that matches said keyword information with the plurality of predetermined keywords for finding at least one identified recorded keyword consistent with the keyword information, and upon matching said key word information:
automatically determines a current navigational position of the portable device,
automatically identifies at least one landmark, associated with the at least one identified recorded keyword, within a map image, and
automatically displays the current navigational position within the map image and the at least one identified landmark within the displayed map image.

2. The portable device of claim 1, further comprising:
a changing portion that changes the scale for the map image when the landmark associated with the recorded keyword is not be within the map image, so that the landmark is displayed within the map image.

3. The portable device of claim 1, further comprising:
an identifying portion that identifies timing information, contained in the broadcast stream, for synchronizing the first content with the keyword information; and associating the first content with the landmark information with the keyword information sharing the same timing information.

4. The portable device of claim 1, further comprising:
a determining portion that determines a route to the position of the landmark and informing a user of the route.

5. The portable device of claim 1, wherein said broadcast content and keyword information are contained in a data transport system and said broadcast content is a commercial message.

6. The portable device of claim 5, wherein the landmark is associated with the commercial message.

7. The portable device of claim 1, wherein the landmark is displayed so that the landmark is distinguished from other landmarks found within the map image.

8. The portable device of claim 1, wherein the map information is recorded in a DVD-ROM.

9. The portable device of claim 1, wherein at least one keyword is associated with a plurality of landmarks.

10. The portable device of claim 1, wherein at least one landmark is associated with a plurality of recorded keywords.

11. A portable device, comprising:
means for displaying map information for a predetermined area;
means for receiving a broadcast stream having a commercial message;
means for producing, from the broadcast stream, a first content, including at least one of a video signal and an audio signal, and a second content, including keyword information, the keyword information containing a plurality of keywords;
means for recording a plurality of predetermined keywords associated with position information, specified in the map information data; and
means for matching said keyword information with the plurality of predetermined keywords for finding at least one identified recorded keyword consistent with the keyword information, and upon matching said key word information:
automatically determining a current navigational position of the portable device,
automatically identifying at least one landmark, associated with the at least one identified recorded keyword, within a map image, and
automatically displaying the current navigational position within the map image and the at least one identified landmark within the displayed map image.

12. A computer program product for assisting navigation using a portable device, the computer program product comprising a computer readable medium having program code stored therein, the program code being executable to perform operations comprising:
displaying map information for a predetermined area;
receiving a broadcast stream having a commercial message;
producing, from the broadcast stream, a first content, including at least one of a video signal and an audio signal, and a second content, including keyword information, the keyword information containing a plurality of keywords;
recording a plurality of predetermined keywords associated with position information, specified in the map information data; and
matching said keyword information with the plurality of predetermined keywords for finding at least one identified recorded keyword consistent with the keyword information, and upon matching said key word information:

automatically determining a current navigational position of the portable device, automatically identifying at least one landmark, associated with the at least one identified recorded keyword, within a map image, and automatically displaying the current navigational position within the map image and the at least one identified landmark within the displayed map image.

13. The computer program product of claim 12, wherein the operations further comprise:

changing the scale for the map image when the landmark associated with the recorded keyword is not be within the map image, so that the landmark is displayed within the map image.

14. The computer program product of claim 12, wherein the operations further comprise:

identifying timing information, contained in the broadcast stream, for synchronizing the first content with the keyword information; and associating the first content with the landmark information with the keyword information sharing the same timing information.

15. The computer program product of claim 12, wherein the operations further comprise:

determining a route to the position of the landmark and informing a user of the route.

16. The computer program product of claim 12, wherein said broadcast content and keyword information are contained in a data transport system and said broadcast content is a commercial message.

17. The computer program product of claim 16, wherein the landmark is associated with the commercial message.

18. The computer program product of claim 12, wherein the landmark is displayed so that the landmark is distinguished from other landmarks found within the map image.

19. The computer program product of claim 12, wherein the map information is recorded in a DVD-ROM.

20. The computer program product of claim 12, wherein at least one keyword is associated with a plurality of landmarks.

21. The computer program product of claim 12, wherein at least one landmark is associated with a plurality of recorded keywords.

* * * * *